(12) United States Patent
Lindskog et al.

(10) Patent No.: US 8,214,711 B2
(45) Date of Patent: Jul. 3, 2012

(54) NEXT DATA INDICATOR HANDLING

(75) Inventors: Jan Lindskog, Pixbo (SE); Roger Wallerius, Sävedalen (SE); Rikard Thomasson, Mölndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 553 days.

(21) Appl. No.: 12/521,707

(22) PCT Filed: Dec. 28, 2006

(86) PCT No.: PCT/IB2006/055043
§ 371 (c)(1),
(2), (4) Date: Jun. 29, 2009

(87) PCT Pub. No.: WO2008/081222
PCT Pub. Date: Jul. 10, 2008

(65) Prior Publication Data
US 2010/0325502 A1    Dec. 23, 2010

(51) Int. Cl.
*G08C 25/02* (2006.01)
*H04L 1/18* (2006.01)
(52) U.S. Cl. ..................................................... 714/748
(58) Field of Classification Search .................... 714/748
See application file for complete search history.

(56) References Cited

U.S. PATENT DOCUMENTS

| 7,414,989 B2* | 8/2008 | Kuchibhotla et al. ......... 370/329 |
| 2003/0210669 A1 | 11/2003 | Vayanos et al. |
| 2004/0223507 A1* | 11/2004 | Kuchibhotla et al. ......... 370/428 |

FOREIGN PATENT DOCUMENTS
EP    1662688 A    5/2006
* cited by examiner

*Primary Examiner* — Joseph D Torres (57) ABSTRACT

A method and apparatus for a base station engaging in transmissions via at least a media access layer with a user entity are disclosed. The base station transmits data to the user entity over a high speed scheduling and packet data scheduling channels. The base station has a plurality of hybrid automatic repeat request (HARQ) entities cooperating with a scheduler for transmitting frames from at least the base station to the user entity for a given HARQ process. Each HARQ entity receives either a not acknowledge or an acknowledge signal or detects a discontinuous transmission for a given HARQ process. The base station transmits a next data indicator to the user entity. The user entity has at least one buffer associated with a given HARQ process. The buffer stores and performs incremental combining of received data relating to data from the base station. The buffer is capable of being flushed.

3 Claims, 11 Drawing Sheets

| STEP | HARQ # | TSN | NODE B TX NDI | UE RX NDI | UE COMMENT |
|---|---|---|---|---|---|
| 1 | 1 | | | | |
| 2 | 2 | 10 | 0 | 0 | STORE DATA IN BUFFER ~TSN =10 |
| 3 | 3 | | | | |
| 4 | 4 | | | | |
| 5 | 5 | | | | INCR CRC NEG |
| 6 | 6 | | | ← NACK | |
| 7 | 1 | | | | |
| 8 | 2 | 10 | 0 | 0 | ADD WITH BUFFER FOR TSN=10 |
| 9 | 3 | | | | |
| 10 | 4 | | | | |
| 11 | 5 | | | | INCR CRC OK |
| 12 | 6 | | | ← ACK | (KEEP BUFFER FOR SAFETY) |
| 13 | 1 | | | | |
| 14 | 2 | 16 | 1 | X | NOT RECEIVED |
| 15 | 3 | | | | |
| 16 | 4 | | | | |
| 17 | 5 | | | | |
| 18 | 6 | ← DTX | | | |
| 19 | 1 | | | | |
| 20 | 2 | 16 | 1 | X | NOT RECEIVED |
| 21 | 3 | | | | |
| 22 | 4 | | | | |
| 23 | 5 | DISCARD 16 | | | |
| 24 | 6 | | | | |
| 25 | 1 | | | | |
| 26 | 2 | 20 | 0 | 0 | ADD WITH BUFFER FOR TSN 20 + 10! |
| 27 | 3 | | | | RECEIVED CORRECTLY |
| 28 | 4 | | | | BUT CRC NEG |
| 29 | 5 | | | | |
| 30 | 6 | | | ← NACK | |
| 31 | 1 | | | | |
| 32 | 2 | 20 | | | |
| 33 | 3 | | | | |
| 34 | 4 | | | | |

FIG. 10

| STEP | HARQ # | TSN | NODE B TX NDI | UE RX NDI | UE COMMENT |
|---|---|---|---|---|---|
| 1 | 1 | | | | |
| 2 | 2 | 10 | 0 | 0 | STORE DATA IN BUFFER ~TSN =10 |
| 3 | 3 | | | | |
| 4 | 4 | | | | |
| 5 | 5 | | | | INCR CRC NEG |
| 6 | 6 | | | ← NACK | |
| 7 | 1 | | | | |
| 8 | 2 | 10 | 0 | 0 | ADD WITH BUFFER FOR TSN=10 |
| 9 | 3 | | | | |
| 10 | 4 | | | | |
| 11 | 5 | | | | INCR CRC OK |
| 12 | 6 | | | ← ACK | KEEP BUFFER FOR SAFETY |
| 13 | 1 | | | | |
| 14 | 2 | 16 | 1 | X | NOT RECEIVED |
| 15 | 3 | | | | |
| 16 | 4 | | | | |
| 17 | 5 | | | | |
| 18 | 6 | ← DTX | | | |
| 19 | 1 | | | | |
| 20 | 2 | 16 | 1 | X | NOT RECEIVED |
| 21 | 3 | | | | |
| 22 | 4 | | | | |
| 23 | 5 | DISCARD 16 | | | |
| 24 | 6 | | | | |
| 25 | 1 | | | | |
| 26 | 2 | 20 | 1! | 1 | FLUSH BUFFER |
| 27 | 3 | | | | ADD WITH BUFFER FOR TSN=20 ONLY |
| 28 | 4 | | | | INCR CRC OK |
| 29 | 5 | | | | |
| 30 | 6 | | | ← ACK | |
| 31 | 1 | | | | |
| 32 | 2 | 25 | | | |
| 33 | 3 | | | | |
| 34 | 4 | | | | |

NEXT DATA INDICATOR HANDLING

FIELD OF THE INVENTION

The present invention relates to packet data traffic and signaling between a user entity (UE), a radio base station (Node-B) and a radio network controller (RNC). More particular the invention pertains to HSPDA (High Speed Packet Data Access) traffic making use of among others the MAC-hs (Medium Access Control High Speed) and RLC (Radio Link Control Layer) data transmission protocols.

BACKGROUND OF THE INVENTION

HSPDA provides high speed downlink access from an UMTS base station (Node B) to a plurality of user entities by flexible allocation of downlink resources.

In prior art document WO2005/034418 FIG. 3, the protocol layers involved in the communication between user entity (e.g. mobile station), Node B (base station), RNC (implemented by parts CRNC, and SRNC) are shown. The user entity involves the following layers: PHY (physical layer), MAC-hs (HSPDA Media Access Control layer), MAC_d (Medium Access Control Device) RLC (Radio Link Control layer). Node B communicates via the MAC-hs layer with the user entity and via a frame protocol HS_DSCH-FP with the RNC, respectively.

According to the HSPDA specifications, the RLC operates above the MAC-hs protocol in the protocol stack. The RLC layer provides the connection to upper communication layers such as TCP/IP, both in the user entity and the RNC. Both the RLC protocol and the MAC-hs protocol are ARQ (Automatic Repeat Request) protocols featuring retransmissions of incorrectly received protocol data units.

As the name implies, the High Speed Downlink Packet Access (HSDPA) technology provides substantial data capacity advantages. The technical specification 3GPP TS 25.321 concerns the MAC (Media Access Control) architecture and the various entities from a functional point of view. 3GPP 25.211 basically describes how information from the MAC-layers is mapped onto the channels sent out on the air.

In contrast with release 99 (GSM/EDGE) which exclusively defines channels between the RNC and the UE, HSPDA introduced the HS-DSCH (High Speed Dedicated Shared Channel) channel which is terminated between the user entity and the base station set (NODE B) also denoted Node B. The HSPDA Medium Access Control (MAC-hs) enables increased packet data throughput due to link adaptation (Adaptive Modulation Coding—i.e. 16QAM or QPSK) and fast physical layer retransmission combining. Hence, besides incorporating the WCDMA access technology, Node B carries out scheduling and Hybrid Automatic Repeat Request (H-ARQ) retransmissions on the channel between the user entity and Node B. The benefits and the features of the above system have for instance been described in "WCDMA evolved—High Speed packet data services", by Stefan Parkwall et al., Ericsson review No. 2, 2003.

The HSPDA transmission makes use of a 2 ms transmission time interval (three time slots).

Figure 1:
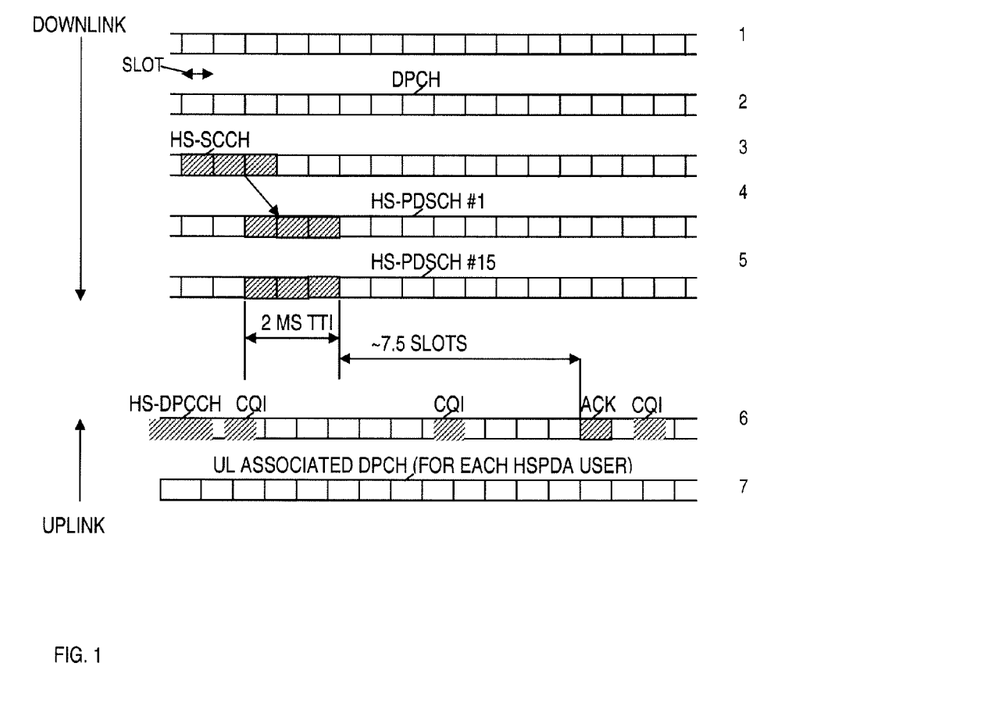
FIG. 1 shows channels according to HSPDA

On the downlink side, see FIG. 1, there is provided: Several common data channels 1, a Downlink Physical Channel (DPCH-R99) dedicated signal radio bearer 2 for each user entity using HSPDA transmissions; a common High Speed Shared Control Channel (HS-SCCH) for control signalling 3, a number of High Speed-Physical Downlink Shared Channels (HS-PDSCH) common user data channels 4-5, which are allocated HSPDA data in a flexible manner.

On the uplink side, see also FIG. 1, there is provided: a High Speed-Dedicated Physical Control Channel (HS-PDCCH) 6—for, among other things, providing channel quality information, CQI, and HSPDA automatic request signalling—and an uplink dedicated channel associated with each HSPDA user comprising control information and data, 7.

HSDPA (High Speed Downlink Packet Access) facilitates high speed transmission on the downlink from Node-B and to the user entity (UE). Under HSPDA, Node-B buffers incoming downlink end-user data and utilises an internal scheduling entity to determine on which particular channel and when to transmit buffered data according to a scheduling routine. To aim in the scheduling decision, Node-B continuously receives channel quality estimates from the UE entities. Node-B also has knowledge about UE receive capabilities.

Node-B can transmit MAC-hs PDUs (Media Access Control High Speed Protocol Data Units) to the UEs at a pace of up to 500 times per second. At each 2 ms transmit opportunity (TTI transmit time interval) Node-B can vary the MAC-hs PDU size depending on the buffered amount of data, the channel quality estimates, the UE capabilities and the granted amount of downlink codes available. MAC-hs data for 1 UE up to 4 UEs can be scheduled at each 2 ms transmit opportunity utilising code division (WCDMA) among the scheduled UEs.

The UE decodes the HS-SCCH (High Speed Shared Control Channel), and upon a successful CRC checksum the UE continues to decode the HS-PDSCH (High Speed Physical Data Shared Channel). Depending on the outcome of the HS-SCCH and HS-PDSCH, the UE transmits a reception feedback back to the peer Node-B.

The reception feedback is interpreted by the Node-B transmitter, which upon a negative feedback or absence of feedback (DTX) indicating a possible reception failure for the UE, retransmits data.

According to specification 3GPP 25.321 chapter 11.6.1 and 11.6.2, there is utilized a HSPDA N-channel stop and wait (SAW) ARQ, implying that a number of 1-8 HARQ processes may exist at a time per user entity. The timing relation between the downlink HS-DPCCH channel and the uplink ACK/NACK transmissions on the HS-PDSCH are fixed, that is, the ACK, NACK messages are arranged to be transmitted, such that there are always 7.5-9.5 TTI slots between a transmission and the associated expected ACK/NACK from a user entity. This allows for Node-B to easily determine when to retransmit data in the case of a missing response to a first transmission. The 8 HARQ processes mentioned above reassure that Node-B may always utilise a subsequent DPCH slot for transmission to a specific UE either with a retransmission of previously sent MAC-hs data, or for a new MAC-hs transmission.

Base Station and User Entity

Figure 5:
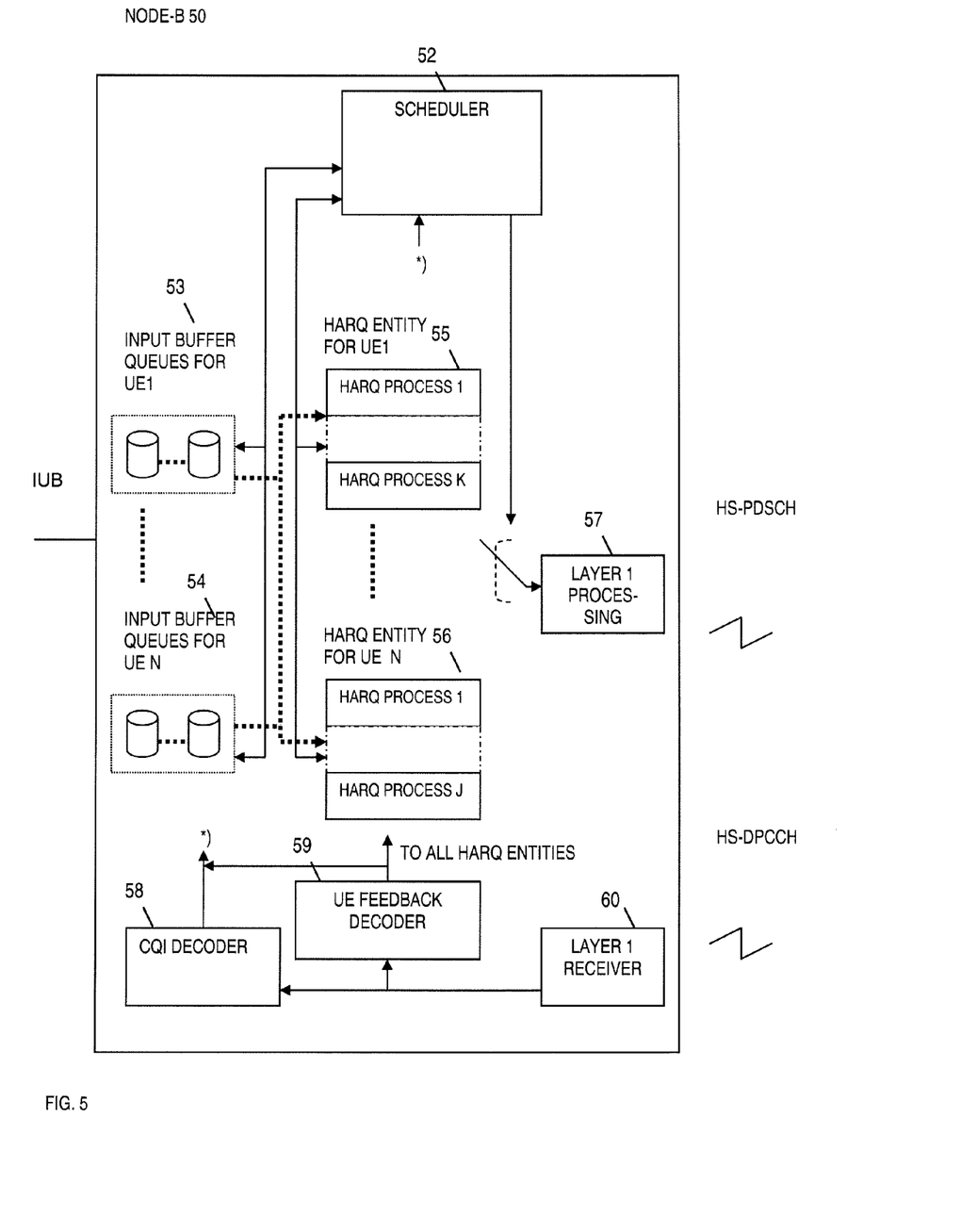
FIG. 5 shows a base station implementation according to the prior art and a first embodiment of the invention.
Figure 6:
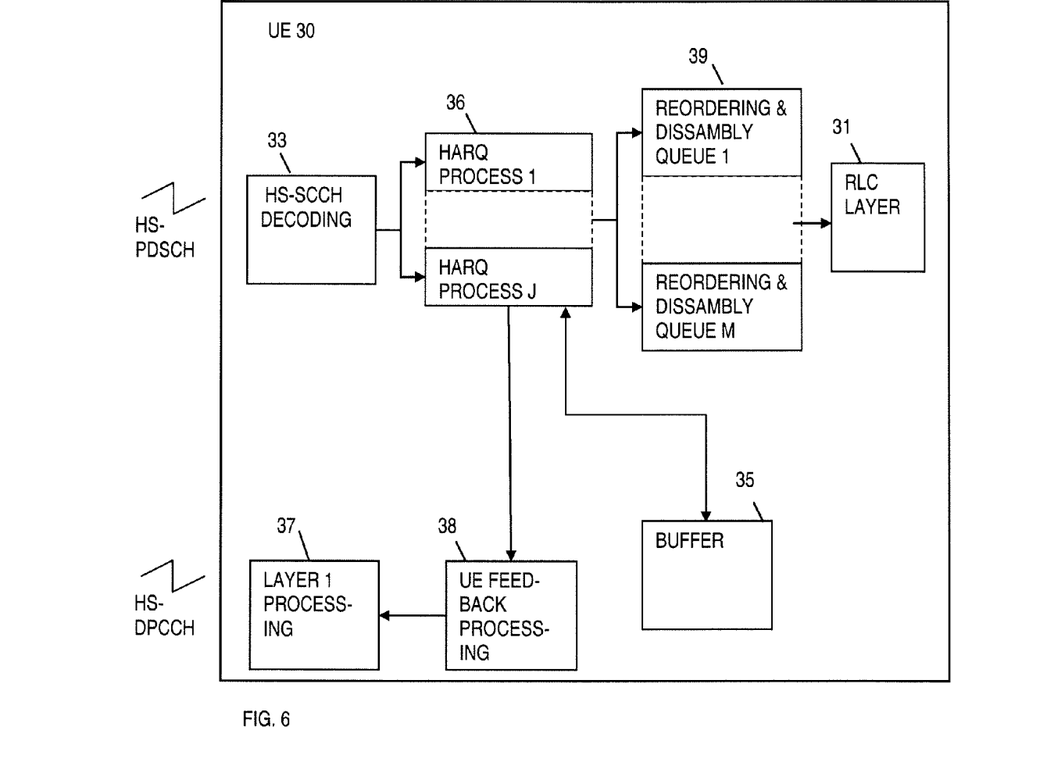
FIG. 6 shows a user entity implementation according to the prior art and a first embodiment of the invention.

In FIGS. 5 and 6, diagram of a base station set (Node B) and a user entity (UE), respectively, are shown.

The base station set, node B, 50, comprises a scheduler, 52, a number of input buffers, 53, 54, storing segments of data streams pertaining to individual user entities, UE1-UEn. For each UE a HARQ entity 55, 56 each comprising a number of HARQ processes for handling simultaneous transmissions to several UE's, that is, for each user entity as well, Layer 1 processing means 57 for transferring data from respective HARQ processes. The base station moreover comprises a CQI decoder, 58, a user entity (UE) feedback decoder 59 and a layer 1 receiver, 60.

Each HARQ process 55, 56, in a given user entity is mirrored in Node B, and corresponds to a given data stream which is received by a particular user entity. As explained above, more data streams may be used by the user simultaneously corresponding to one application or more simultaneous applications running on the user entity apparatus, possibly with different QoS requirements. Moreover, consecutive data may be transmitted for the same user entity, the consecutive transmission belonging to different HARQ processes.

Moreover, Node B comprises at least one specific input buffer queue dedicated to a corresponding set of HARQ processes.

In FIG. 6, a user entity (MAC) 30 arrangement according to the invention is shown comprising HS-SCCH decoding means, 33, for decoding the downlink HD-PDSCH channel, arrangements consisting of a number J of HARQ processes, 36, a number M of reordering and disassembly queues, 39, and a RLC (Radio Link Control) layer means 31. Moreover, there is provided UE (User Entity) feedback processing means, 38, and layer 1 processing, 37, for providing feedback on the HS-DPCCH channel. Finally buffer means 35 are provided for each HARQ process 36. The buffer means may be arranged as one resource or buffer 35 a plurality of resources or buffers. The buffer may be arranged as a soft memory which is partitioned across the HARQ processes in a semistatic fashion through upper layer signalling. Node B should take into account the UE soft memory capability when selecting transport formats for transmission and retrans-mission and selecting redundancy versions.

The reordering queue distribution function, 39, routes the MAC-hs PDU's to the correct reordering buffer based on a Queue ID. The reordering entity reorders received MAC-hs PDU's according to the received TSN (transmit sequence number). MAC-hs PDU's with ascending TSN's (MAC hs Transmit Sequence Numbers) are delivered to the disassembly function. To recover from erroneous conditions when MAC-hs PDU are missing the same avoidance handling as described in 3GPP TS 25.321-11.6.2, re-ordering release timer and window based stall avoidance, is used. There is one reordering entity for each Queue ID configured at the UE. The disassembly entity is responsible for the disassembly of MAC-hs PDU's. When a MAC-hd header is removed, the MAC-d PDU's are extracted and any padding bits are removed. Then the MAC-d PDUs are delivered to the higher (RLC) layer. These features have been described in 3GPP TS 25.321-11.6.2.3.

The RLC Layer

The RLC layer in 3GPP can operate in three modes, transparent mode, unacknowledged mode and acknowledged mode (AM), which will be focused upon in the following.

In AM mode, incorrectly received PDU's (Protocol Data Units) discovered by the receiving side are effected to be retransmitted by the transmitting side by means of an ARQ (Automatic Repeat Request) protocol.

An AM RLC entity consists of a transmitting side, and a receiving side, where the transmitting side of the AM RLC entity transmits RLC PDU's and the receiving side of the AM RLC entity receives RLC PDU's.

An AM RLC entity resides in the UE (user equipment) and in the RNC (radio network control), respectively. The transmitting side segments and/or concatenates RLC SDU's (service data units) into PDU's of a fixed length. The receiving side reassembles received PDU's into RLC SDU's and transmits these to higher data layers. Likewise, SDU's are received from the layer above the RLC layer. In AM mode, the RLC layer is responsible for the delivery of SDU's in consecutive order.

In FIG. 4 of the above document WO2005/034418, an implementation of the acknowledged mode (AM) UE (base station)/UTRAN (Radio access node/base station (Node B)) entity is shown.

To facilitate the in-sequence delivery, each RLC PDU is given a sequence number, 0-4095, whereby the transmitter transmits PDU's with increasing sequence number modulo 4096. Using the sequence number, the receiver can detect a missing PDU. The receiver can be configured to transmit a STATUS message upon the detection of a missing PDU. The STATUS report may contain positive or negative acknowledgement of individual RLC PDU's received by the peer RLC entity. The transmitter can also request a STATUS messages from the receiver by setting a Poll flag in the PDU header. The conditions for that the transmitter sets the Poll flag are among others:

Last PDU in Buffer:
When only one PDU exists in the input buffer.
Poll Timer Expires:
When the timer_poll expires, that is, the transmitter requested a STATUS earlier and initiated a timer_poll to reassure that a response is received.
Window Based Setting:
A transmitter is restricted in the amount of "outstanding data" it can transmit until a STATUS confirms the reception to the receiving side. "Outstanding data" relates to the earliest unacknowledged PDU.

It should be noted that the above description of the functionality of the RLC layer only constitutes a small excerpt of those features actually provided.

Selective retransmissions are possible, e.g. if STATUS message indicates PDU with sequence number (SN) 3, 6 and 13 are missing, only 3, 6 and 13 needs to be retransmitted.

MAC-hs Layer

In the following description regarding the MAC-hs layer:
the MAC-hs transmitter is the Node-B.
the MAC-hs receiver is the UE equipment being either a mobile station or a pc-card attached to a PC or any other equipment capable of receiving downlink 3GPP HSDPA traffic.

MAC-hs PDU's are numbered by modulo TSN (Transport Sequence Number) cycling through the field 0 to 63.

As mentioned above, the MAC-hs protocol provides multiple Hybrid-ARQ processes (HARQ) whereby for each HARQ process, the transmitter transmits a MAC-hs PDU and awaits either an ACK indicative of reception at the receiver or Negative Acknowledgement (NACK) indicative that the receiver did not receive the MAC-hs PDU or absence of a response (DTX). The round trip time concerning the time from MAC-hs PDU transmission until reception of the feedback (ACK/NACK) is fixed. Upon the reception of a NACK or DTX, the MAC-hs transmitter retransmits the MAC-hs PDU. Since the round trip time is long in relation to the MAC-HS PDU size and since multiple users may be adapted to receive packets in time multiplexed fashion, multiple HARQ processes are provided. If only one HARQ process was available, the duty cycle (i.e. actual transmission time/total possible transmission time) would be low. By using multiple HARQ processes, one HARQ process can await a response, while another HARQ process, or multiple HARQ processes, may transmit. Thereby, the duty cycle can be rendered close to 100 percent.

The MAC-hs protocol is semi-reliable, that is, the MAC-hs transmitter may choose to discard or delete a MAC-hs PDU that has been transmitted and possibly been retransmitted to the MAC-hs receiver.

By discarding a MAC-hs for retransmission, unnecessary transmissions are prevented over the radio link in case the MAC-hs receiver has moved to another cell or has powered down or if the receiver for any other reason is not capable of receiving data. Therefore, buffered packets are discarded at the transmitter either at the expiry of a timer set at a predetermined time (e.g. T1) corresponding to the first transmission of the packet in question or when a maximum number of retransmissions of the packet in question have been performed or based upon a too long waiting time in the input data buffer, whatever appears first or a combination thereof.

The MAC-hs receiver utilizes a receiver window for the purpose of mitigating the effect of unnecessary transmissions when PDU's are received in non-ascending sequence order (which can occur due to retransmissions). Whenever a MAC-hs PDU is successfully received with a TSN (Transmit Sequence Number) equal to the next expected TSN, the receiver can deliver PDU's to the RLC layer. Depending on whether the subsequent TSN number (i.e. next expected TSN+1) has previously been successfully received, that MAC-hs PDU can also be delivered and so forth. The receiver window is updated accordingly. Delivery to the RLC layer from the MAC-hs protocol is done in consecutive order also denoted in-sequence.

Figure 2:
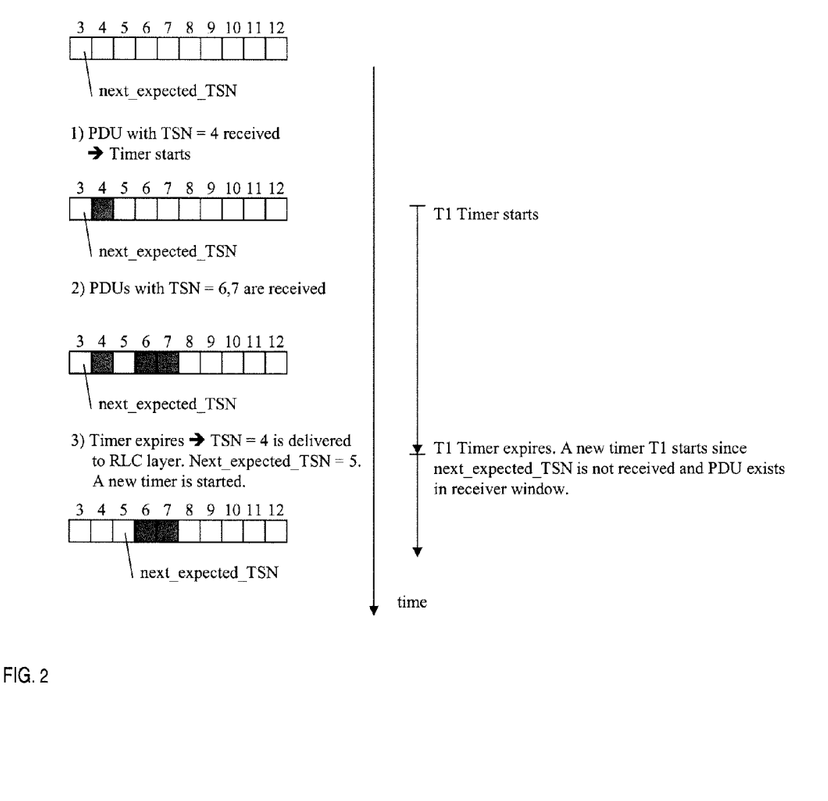
FIG. 2 shows a known MAC-hs procedure for timer based stall avoidance.

To recover from the situation where e.g. the transmitter has discarded a MAC-hs PDU, the receiver utilizes two mechanisms I)+II) to solve the problem:

I) Timer Based Stall Avoidance:

At the reception of a PDU with TSN>next_expected_TSN the receiver starts a timer denoted T1. When the timer expires, the receiver makes proper actions to allow for subsequent PDU's to be received. The exact details are described in 3GPP 25.321 Chapter 11.6.2.3.2. The behavior is shown in FIG. 2.

At time 1) a PDU with TSN=4 is received, the next expected transmit sequence number being 3, whereby timer T1 starts.

At time 2) PDU's with TSN 6 and 7 are received.

At time 3), the timer expires, whereby TSN=4 is delivered to the RLC layer. Next expected_TSN=5. A new timer T1 starts since next_expected_TSN=5 is not received and at least one PDU exists in receiver window.

4) TSN 6 and 7 remains in buffer.

II) Window Based Stall Avoidance:

Upon the reception of a PDU with TSN outside the receiver window, the receiver shall shift its "right" (or "upper") window edge and highest_received_TSN to the received TSN. Next_expected_TSN shall be updated to highest_received_TSN-receiver window size+1 previously PDU's stored in window that now fall outside the window shall be delivered to RLC layer. This has been illustrated in FIG. 3.

Figure 3:
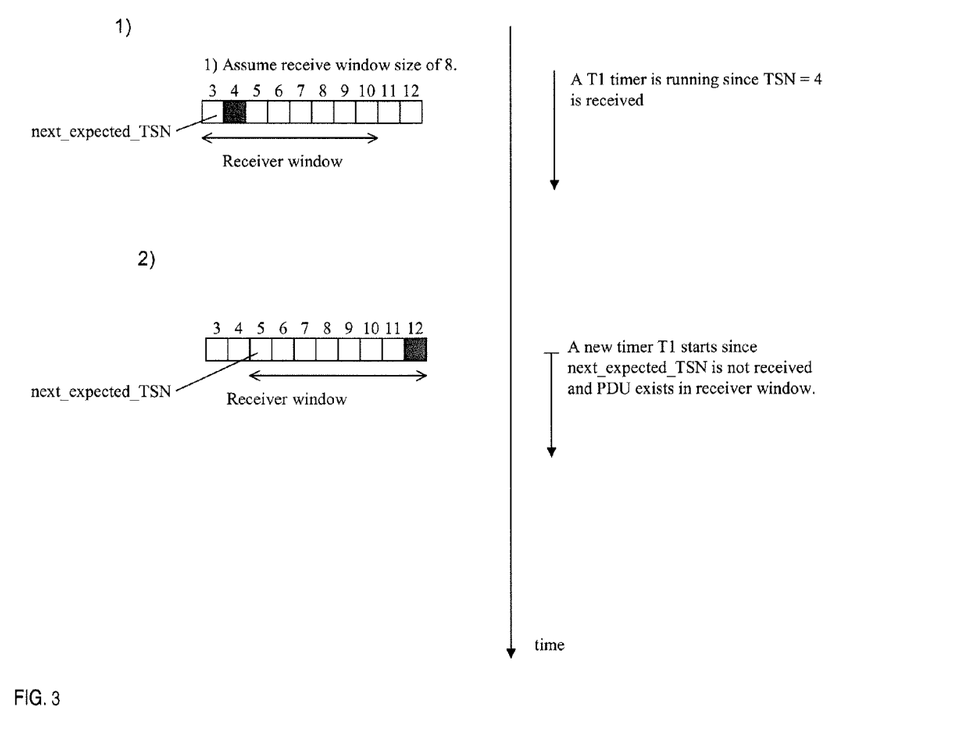
FIG. 3 shows a known procedure for window based stall avoidance.

Assume that the receiver window size is of length 8.

At time 1) PDU TSN 4 has been received, which is within the receiver window, TSN=3 is next_expected_TSN, timer T1 is running.

At time 2) TSN=12 is received, which is outside the receiver window thus causing the window to advance, the next_expected_TSN is updated, and PDU TSN=4 is delivered to RLC. A new timer T1 starts since next_expected_TSN is not received and a PDU exists in the receiver window.

Further Features of the MAC Layer:

MAC-hs reset:

MAC-hs is used to restart the MAC-hs protocol, where the MAC-hs receiver delivers stored data in its receiver window to RLC layer and sets its next_expected_TSN=0 and highest_received_TSN=63. It is used upon conditions such as handover between cells.

UE Addressing in HS-SCCH:

A UE ID (In 3GPP denoted Radio Network Temporary Identifier (RNTI)) that identifies the UE for which the HS-SCCH information is intended is implicitly included in the CRC (Cyclic Redundancy Check). When generating the CRC checksum in Node-B, the UE ID is included in the calculation. Upon reception of a HS-SCCH a UE utilizes its ID in the calculation of the CRC to check whether HSDPA data is destined to the UE.

HS-SCCH Content:

The HS-SCCH has the following content:
Transport-Format and Resource-related-Information (TFRI)
HARQ ARQ-related information such as,
 HARQ process number
 Redundancy version (RV)
 New-Data-Indicator (NDI)

Figure 4:
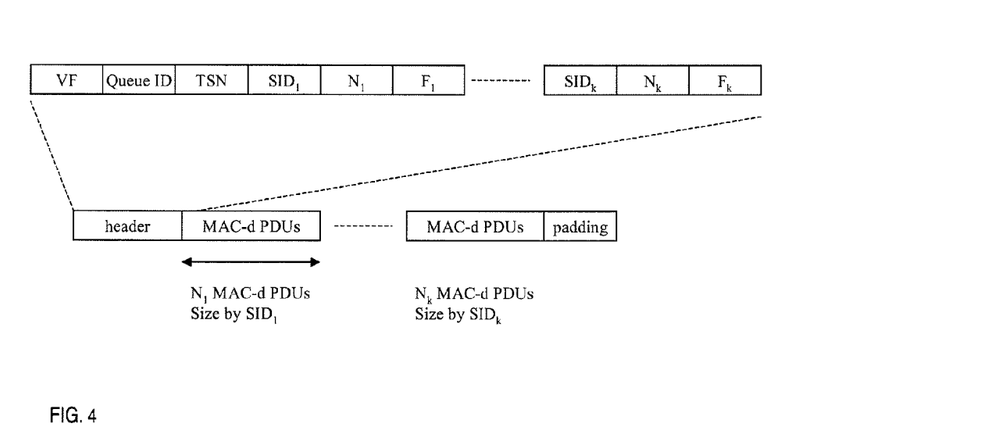
FIG. 4 shows the known MAC-hs header structure.

MAC-hs Header Content:

In FIG. 4, a MAC-hs transmission to one HARQ process queue ID, with sequence number TSN, and k different SID (Size Index Identifier) are shown. Either the transmission comprises k different SIDs or less than k if the transmission order is 'first SID followed by second SID followed by first SID again and so forth'.

Using multiple SID is a mechanism by which higher layer can utilise one single MAC-hs queue for transmission of several higher layer priority queues, each of which has a specific SID.

Incremental redundancy is used by HSDPA, whereby each HARQ process buffers previously unsuccessfully received data. The stored information is utilized in a cyclic redundancy check (CRC) process wherein the stored information and the recent information are combined before being fed to the decoded of the error-correction code so as to resolve data transmitted over multiple occasions. Chase combining is considered to be a particular case of Incremental Redundancy. To support the Incremental Redundancy combining scheme, the Redundancy Version (RV) is signaled in the HS-SCCH. This process has been described further in 3GPP 25.214. When successfully decoding data, a positive cyclic redundancy check value is formed indicating that data has been correctly received. Which particular retransmission method to use is fully determined by the Node-B and is indicated to the UE via the RV in each HS-SCCH in each TTI.

The new data indicator flag according to 3GPP 25.321 is used by Node B as an indication for the user entity. According to 3GPP the conditions for operating the NDI is specified as follows:

The HARQ process sets the New Data Indicator (NDI) in transmitted MAC-hs PDUs. UTRAN should:
 set the New Data Indicator to the value "0" for the first MAC-hs PDU transmitted by a HARQ process;
 not increment the New Data Indicator for retransmissions of a MAC-hs PDU;
 increment the New Data Indicator with one for each transmitted MAC-hs PDU containing new data.

According to 3GPP 25.321 it is noted that the scheduler may re-use TSNs by toggling the NDI bit in order to resume pre-empted transmissions or to force the UE to flush the soft buffer. In this case the content of the payload may be changed but care should be taken to preserve the higher layer data order.

3GPP does not specify the HARQ process behavior upon a successful decoding of MAC-hs, which opens up for two possible alternatives for a UE manufacturer:

To flush, i.e. to delete, the stored HARQ process information (UE behavior 1).

The benefit of this behavior is that the HARQ process can be independent of the NDI setting in subsequent MAC-hs transmission, i.e. to accept both an incremented and a non-incremented NDI.

The drawback of this behavior will occur when the acknowledgement transmitted back to the Node-B fails, and Node-B retransmits the MAC-hs transmission. Note that the MAC-hs has already been delivered to the reordering entity so that is not a problem, but the problem lies in the fact that unnecessary MAC-hs transmissions may occur and an increased risk of stalling the Node-b sender.

To store the HARQ process information (UE behaviour 2).

To store the HARQ process information will mitigate the effect of the behavior (UE behavior 2) above when a Node-B fails to decode a transmitted ACK. In the following it is assumed that the prior art user entities stores buffer information until for example an NDI indication is received.

SUMMARY OF THE INVENTION

It is a first object of the invention to overcome the problem of erroneous incremental buffer operations in a receiver.

This object has been accomplished by the method for transmitter entity specified in claim 1 when operating with user entities having a given behavior in which buffer values are stored, wherein the transmitter entity carries out the steps of
  awaiting a scheduling instruction or scheduling of download data;
  if the outcome from previous media access transmission or transmissions is detected as a discontinuous transmission (DTX) setting the next data indicator (NDI) to the value previously used,
  otherwise toggling the next data indicator value;
  transmitting data for the given hybrid automatic repeat request (HARQ) process.

This object has been moreover accomplished by the transmitter entity specified in claim 5 even when operating with known user entities having a given behavior.

It is a further object to set forth improvements for the user entity with regard to efficient handling of data in buffers.

This object has been accomplished by the method defined in claim 2, wherein the method comprises the steps of—starting a timer whenever data from the base station (Node B) is correctly decoded over a HS-SSCH channel for a given HARQ process;
  if the timer expires without any subsequent data is being correctly decoded over the HS-SCCH channel for the given HARQ process;
  flushing the content of stored HARQ information for the given HARQ process.

Further aspects have been accomplished by method claim 3 and the user entities defined in claims 7 and 8, wherein Further advantages will appear from the following detailed description of the invention.

DETAILED TECHNICAL DESCRIPTION OF PREFERRED EMBODIMENTS OF THE INVENTION

Figure 7:
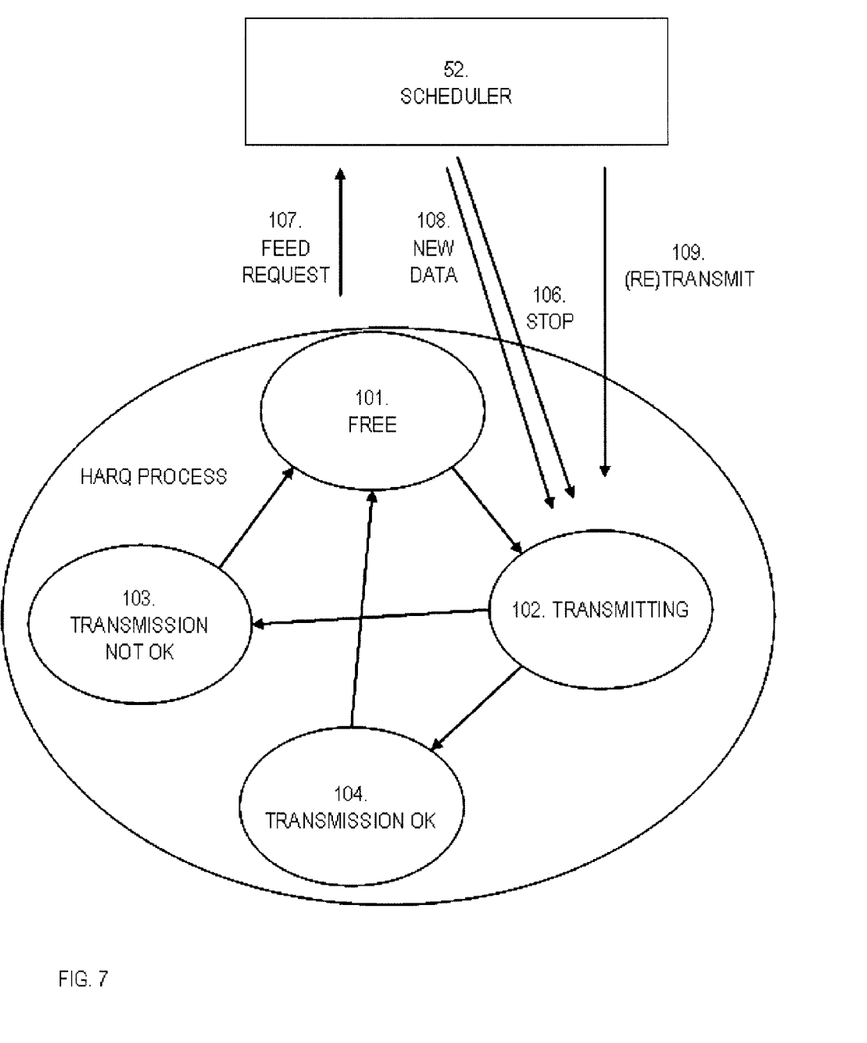
FIG. 7 shows a known scheduling HARQ process interaction state diagram.

In FIG. 7, a state diagram pertaining to a given HARQ process in a HARQ entity according to the invention is shown. The state diagram illustrates the interaction of a given HARQ process with the Node B scheduler, which is shown in the implementation shown in FIG. 5. According to FIG. 7, the HARQ process may attain a free state 101, where no data is assigned for the given HARQ process. When data is handed down from the scheduler, 52, for assignment to the HARQ process, the given data is assigned to the HARQ process for transmission, state 102. In this state, the data is buffered and is ready for transmission/retransmission or discarding depending on the outcome of the communication with the interacting receiving side of the HARQ process, that is, for instance, the user entity as receiving side. At the reception of a (re-)transmit message 109 from the scheduler, the HARQ process transmits buffered data. If a NACK is received, or DTX, the process remain in state 102 and is ready for a retransmission at the reception of a 109 (re-)transmission signal from the scheduler. After a predetermined number of retransmissions, or dependent upon a too long time after first transmission, or a combination thereof, or dependent upon reception of a stop signal 106 from the scheduler, a state change from state 102—transmitting—to state 103—transmission not ok—is inflicted. If on the other hand an ACK is received, the recent transmission is deemed to be successful, 104. Since the radio interface is prone to interruptions and noise, the received messages may not necessarily correspond to the messages transmitted from the receiver. The scheduler interacts with the HARQ process, either when new data should be assigned, i.e. new data is handed down, message 108 or when forcing the HARQ process to stop, 106, and when a transmission or retransmission shall occur 106. The HARQ process in turn, signals the availability of transmission resources in the process as a feed request signal, 107. The scheduler may order the entity to stop any transmission, due to indications from higher higher layers, i.e. RLC, indications or power limit considerations etc.

Node-B can determine when an UE transmitted a feedback upon a MAC-hs transmission. 3GPP specifies the exact timing to be used and both ACK and NACK are explicitly signaled from the UE. A NACK is signaled from the UE when it successfully decodes the HS-SCCH but fails to decode the HS-PDSCH. When the UE fails to decode the HS_SCCH nothing will be transmitted from the UE and Node-B will interpret this as a DTX and initiate a retransmit procedure. Note that DTX can also be detected due to poor uplink radio conditions.

Figure 8:
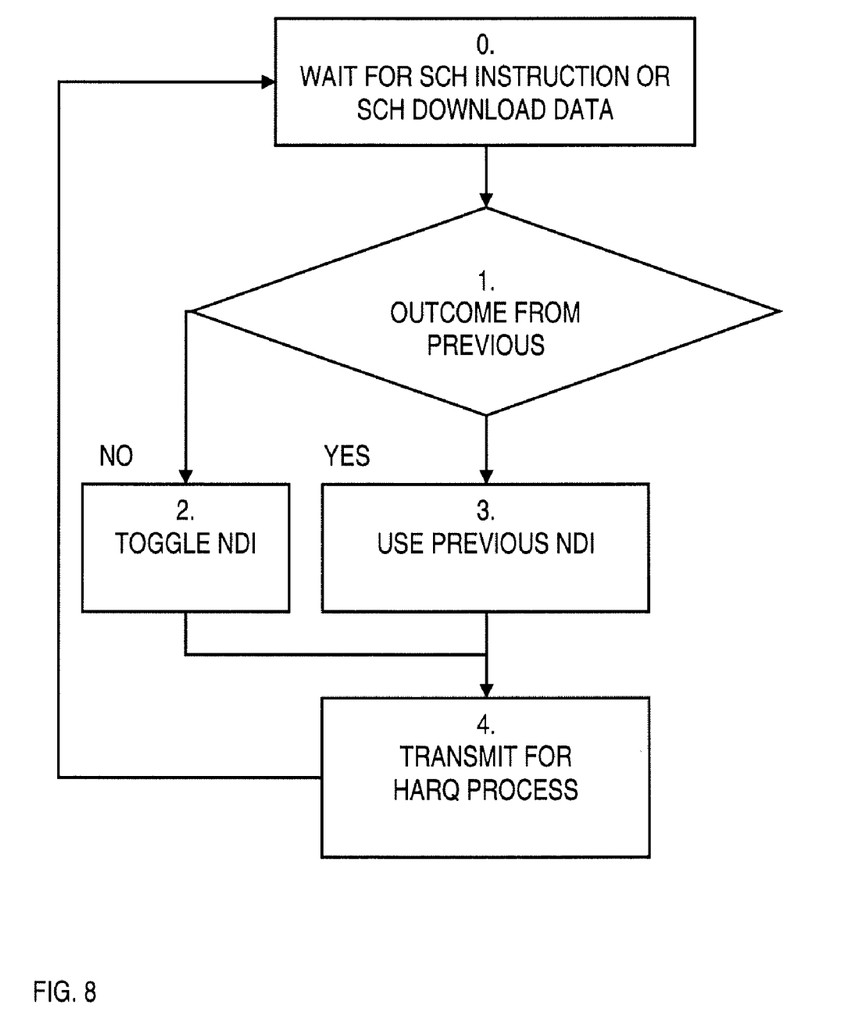
FIG. 8 shows first embodiment of base station functionality according to the invention.

In FIG. 8, a flow diagram pertaining to a given HARQ process of a given HARQ entity in Node B communicating is shown.

In step 0 the HARQ process is waiting for the scheduler to hand down instructions or downlink data. In step 1, the process is evaluating whether the outcome from a previous MAC_hs transmission or previous transmissions were evaluated with a DTX finding by node B, hence that, neither a NACK nor an ACK was received by node B for the corresponding HARQ process reply. If the answer is yes, the NDI is set such as the previous NDI value pertaining to the HARQ process is used, and if the answer is no, the NDI value is toggled or changed in relation to the recent used NDI vale for the HARQ process. Accordingly in step 4, a MAC_hs packet is transmitted for the given HARQ process with the NDI value set as defined above.

In other words there is provided a method for a base station (50) engaging in transmissions via at least a media access (MAC) layer with a user entity (30); wherein
the base station is transmitting data to the user entity over a high speed scheduling channel (HS-SCCH) and a high speed packet data scheduling channel (HS-DPCCH); the base station (50) having a plurality of hybrid automatic repeat request (HARQ) entities (55, 56) cooperating with a scheduler (52) for transmitting frames from at least the base station (50) to the user entity (30) for a given hybrid automatic repeat request process, each hybrid automatic repeat request (HARQ) entity being adapted for receiving either a not acknowledge signal (NACK) or an acknowledge signal (ACK) or detecting a discontinuous transmission (DTX) for a given hybrid automatic repeat request (HARQ) process, the base station (50) being adapted for transmitting a next data indicator (NDI) to the user entity (30);
the user entity (30) having at least one buffer (35) associated with a given HARQ process, the buffer being adapted for storing and performing incremental combining of received data relating to data from the base station (50), the buffer moreover being adapted for being flushed,
the method comprising the steps of
awaiting a scheduling instruction and scheduling of download data (0; 108, 109);
if the outcome from previous media access transmission or transmissions is detected as a discontinuous transmission (DTX) setting the next data indicator (NDI) to the value previously used (3),
otherwise toggling the next data indicator value (NDI)(2);
transmitting data for the given hybrid automatic repeat request (HARQ) process.

The base station carrying out the above steps corresponds to the one shown in FIG. 5, having regard to the state diagram of FIG. 7.

Figure 10:
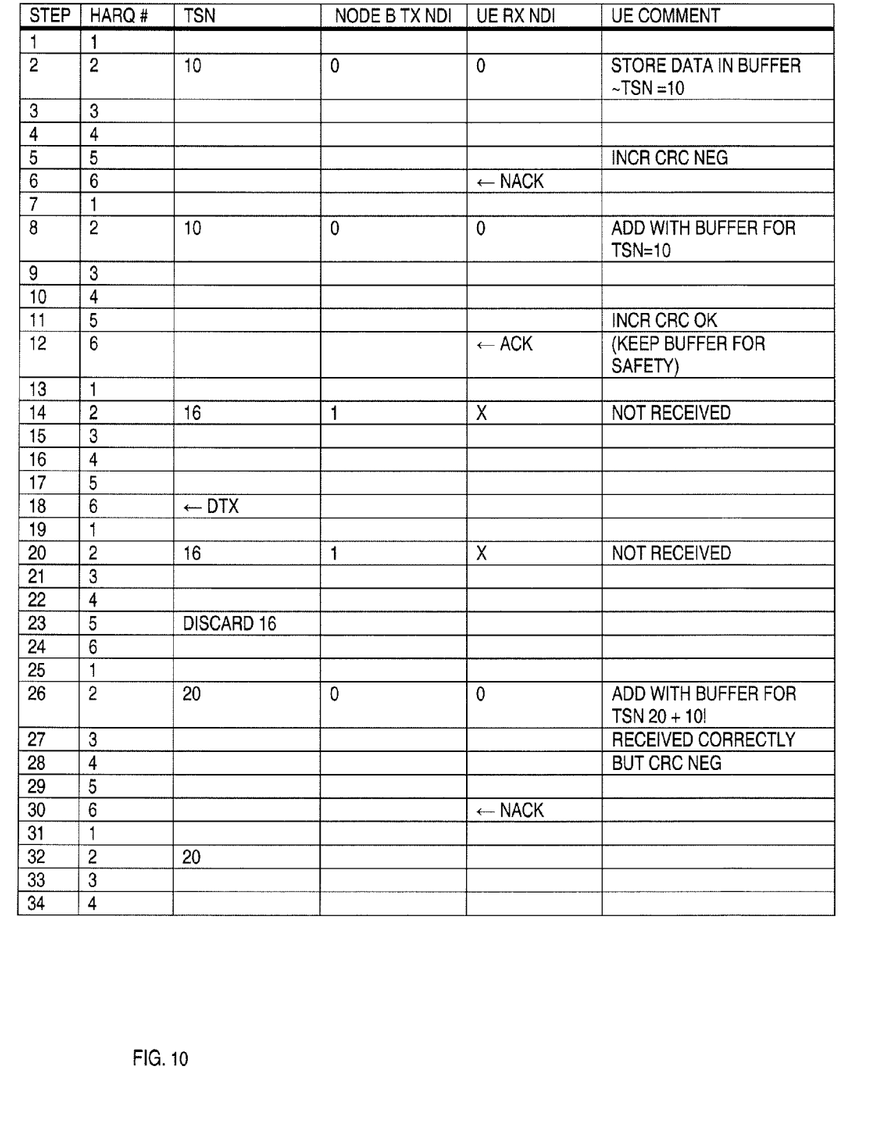

In FIG. 10, an exemplary scenario for the communication between a prior art Node B and a prior art user entity (behavior 2) is given.

The HARQ process in the HARQ entity is shown consisting of 6 HARQ processes, which is normally the case, keeping in mind that up to 8 HARQ processes are possible. In the present example we shall only study HARQ process number 2, although the other 5 processes have been indicated but not further specified for putting the example into perspective. It should be noted that the timely response from the user entity, being either a NACK or an ACK or the perception in node B of a lacking response, i.e. DTX, can not be inferred from the figure.

A given MAC_hs packet comprising a payload having a MAC_hs transmit sequence number (TSN) 10 is attempted transmitted at the outset, step 2. The NDI value is set by default to the value 0 (TX NDI), this value being perceived by the receiver (RX NDI). Consequently, the receiver stores data pertaining to TSN 10 in its HARQ process buffer. On finding that the CRC value which is subject to the incrementally processing as described in connection with the prior art is not OK, step 5, a NACK is transmitted to Node B in step 6.

Node B performs a retransmission of the data pertaining to TSN 10, NDI flag transmitted and perceived by the receiver is 0, step 8. The receiver performs incremental combining of its buffer for data corresponding to TSN 10. This time the cyclic redundancy check is positive, step 11. An ACK is therefore transmitted back to the transmitter, in step 12, while for security reasons the receiver keeps the obtained buffer value, confer user entity behavior 2 above.

Next, the transmitter proceeds to transmitting TSN 16, by example, in step 14. According to the 3GPP specification, Node B, toggles NDI to value 1, for indicating that new data corresponding to TSN 16 is underway to be processed.

In the present scenario, the receiver fails to receive the transmission in step 14, and has therefore no perception of the NDI value. It is not received. No response is given by the receiver, and the transmitter perceives the lacking response for HARQ process 2 normally due at the same time as HARQ process 6 as discontinued transmission, DTX.

A retransmission is attempted in step 20 without success. Consequently, the transmitter discards TSN 16 in step 23.

In step 26, a new TSN 20 is transmitted while toggling NDI to attain the value 0.

Since the receivers' perception of last NDI value was 0, the receiver performs incremental combining with TSN 10 and 20, which will provide a negative CRC value although the transmission was received correctly. The receiver transmits a NACK to the transmitter, step 30. Consequently, step 32, TSN 20 is retransmitted.

Figure 11:
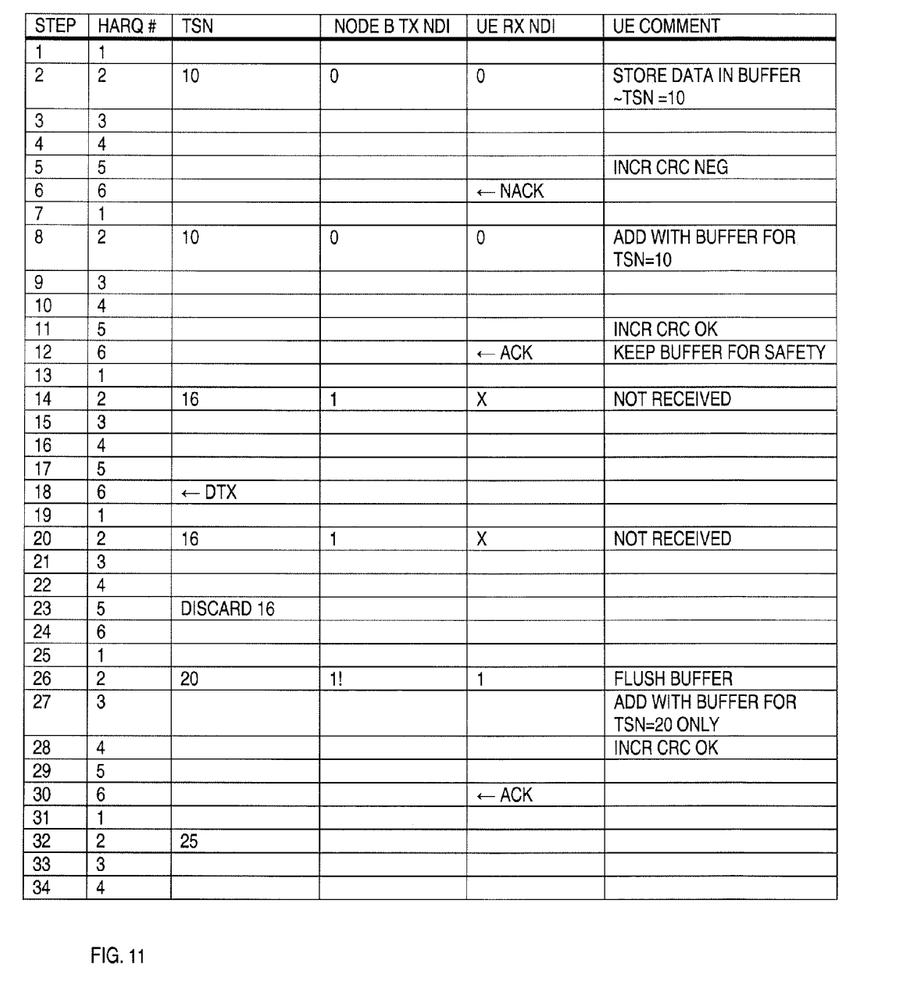

In FIG. 11, an exemplary scenario for the communication between a Node B according to the invention arranged to function as discussed in respect of the flow diagram of FIG. 8 and a prior art user entity (behavior 2) is given. The scenario is also valid for communication between a Node B according to the invention and to a first and to a second embodiment of an improved user entity according to the invention (specified later). The signaling over the radio interface (faulty signaling over the radio interface) is corresponding closely to the scenario given in FIG. 10, so that the differences in handling will be demonstrated.

As appears from FIG. 11, the events corresponding to steps 1-20, are identical to those of FIG. 10. However, in step 26, Node B, according to routine step 1, in FIG. 8—outcome from previous MAC-hs transmission deemed to be an interrupted transmission, DTX—is answered yes—since this was the case in step 26, FIG. 11, Node B uses the previous NDI as stated in routine step 3 of FIG. 8.

A prior art user entity according to behavior 2 (and for behavior 1 for that matter) will flush its buffer 35 and subsequently incrementally add the empty buffer (0) with data for TSN 20. If data is intact after the transmission, the CRC will provide a positive value and the user entity will provide an ACK in step 30. Node B will be ready to transmit new data of e.g. TSN 25 in step 32. It appears that the efficiency of the transmission is enhanced in relation to the scenario of the prior art given in FIG. 10.

According to the invention the performance of the user entity can also be improved.

Figure 9:
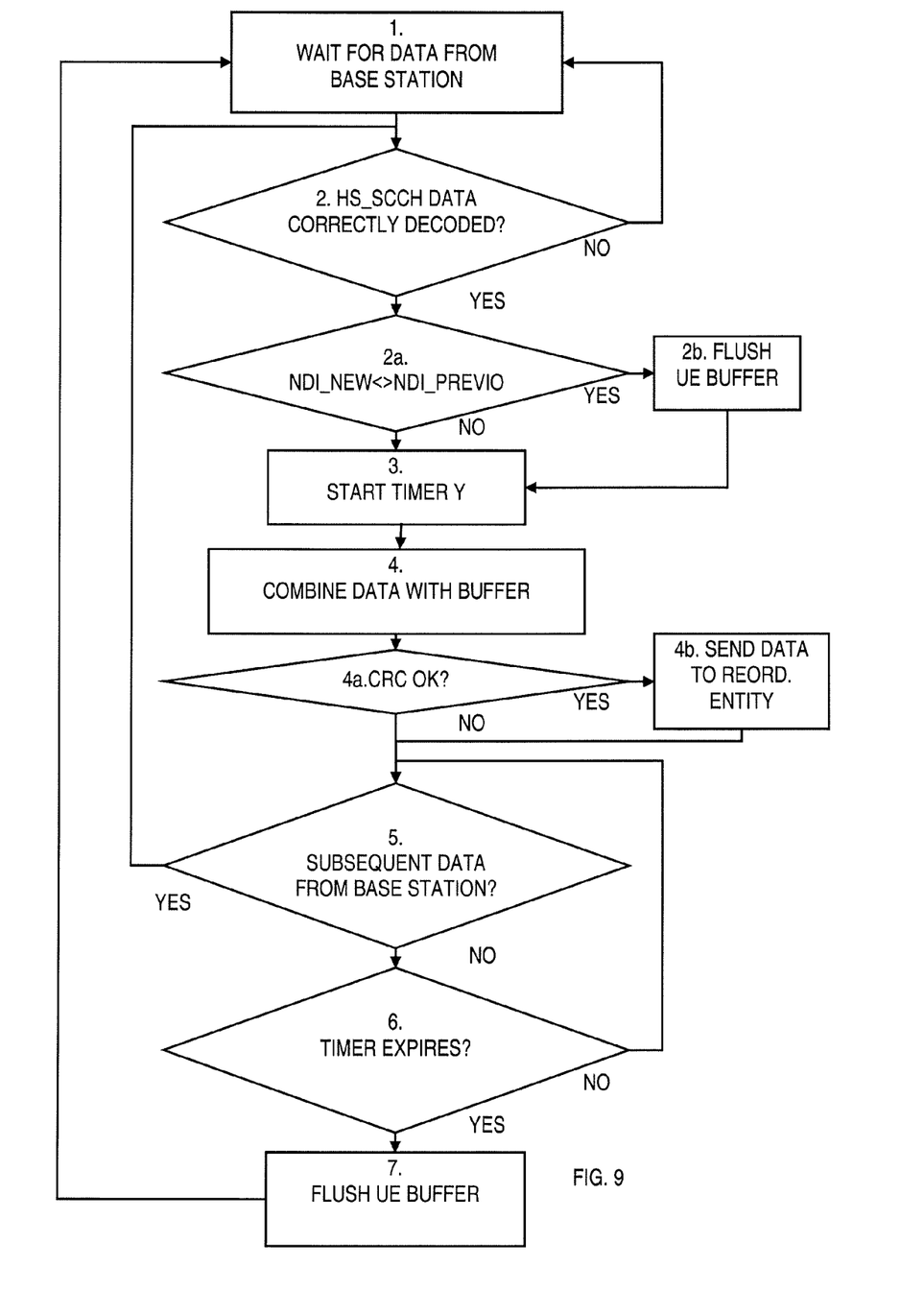
FIG. 9 shows first embodiment of user entity functionality according to the invention, FIG. 10 discloses a scenario over a imperfect radio interface for prior art devices, FIG. 11 discloses a scenario over an imperfect radio interface for at least a first embodiment of a base station according to the invention.

In FIG. 9 a first embodiment of a user entity adapted for co-operating with the first embodiment of the Node B according to the invention (or to a Node B according to the prior art) is shown.

As can be understood from above, the User entity (30) is engaging in transmissions via at least a media access (MAC) layer with a base station (50); wherein the base station is transmitting data to the user entity over a high speed scheduling channel (HS-SCCH) and a high speed packet data scheduling channel (HS-DPCCH);

the user entity engaging in at least one hybrid automatic repeat request (HARQ) process (36) for receiving frames from the base station (50);

wherein a hybrid automatic repeat request (HARQ) entity in a base station being adapted for receiving either a not acknowledge signal (NACK) or an acknowledge signal (ACK) or detecting a discontinuous transmission (DTX) for a given hybrid automatic repeat request (HARQ) process, the base station (50) being adapted for transmitting a next data indicator (NDI) to the user entity (30);

the user entity (30) having at least one buffer (35) associated with a given HARQ process, the buffer being adapted for storing and performing incremental combining of received data relating to data from the base station (50), the buffer moreover being adapted for being flushed.

According to FIG. 9, the user entity is starting a timer (Y) whenever data from the base station (Node B) is correctly decoded over a HS-SSCH channel for a given HARQ process (2, 3);

subsequently data is added with the contents of the buffer 35 for the given HARQ process, step 4;

if the timer (Y) expires, step 6, without any subsequent data is being correctly decoded, step 5, over the HS-SCCH channel for the given HARQ process (5, 6); the user entity is flushing the content of stored HARQ information for the given HARQ process, step 7.

More specifically, the user entity waits for data from the base station, step 1. If HS_SCCH data is correctly decoded from the base station, step 2 it is examined whether the NDI flag has changed from its previous value, step 2a. If that is the case the UE flushes its buffer, step 2b, and if not, step 3, the UE sets a timer Y.

Subsequently, the UE combines the received data with the contents of its buffer. A CRC check is made subsequently, if CRC check is positive data is transferred to the reordering entity and if the CRC check is negative, the process proceeds to step 5, in which subsequent data from the base station is awaited.

If data is received in step 5, the process continues in step 2, if not it is investigated in step 6, whether the timer has expired. It the timer has not expired, the process goes to step 5, and if it has expired the buffer is flushed in step 7, after which the routine commences at step 1 anew.

Figure 12:
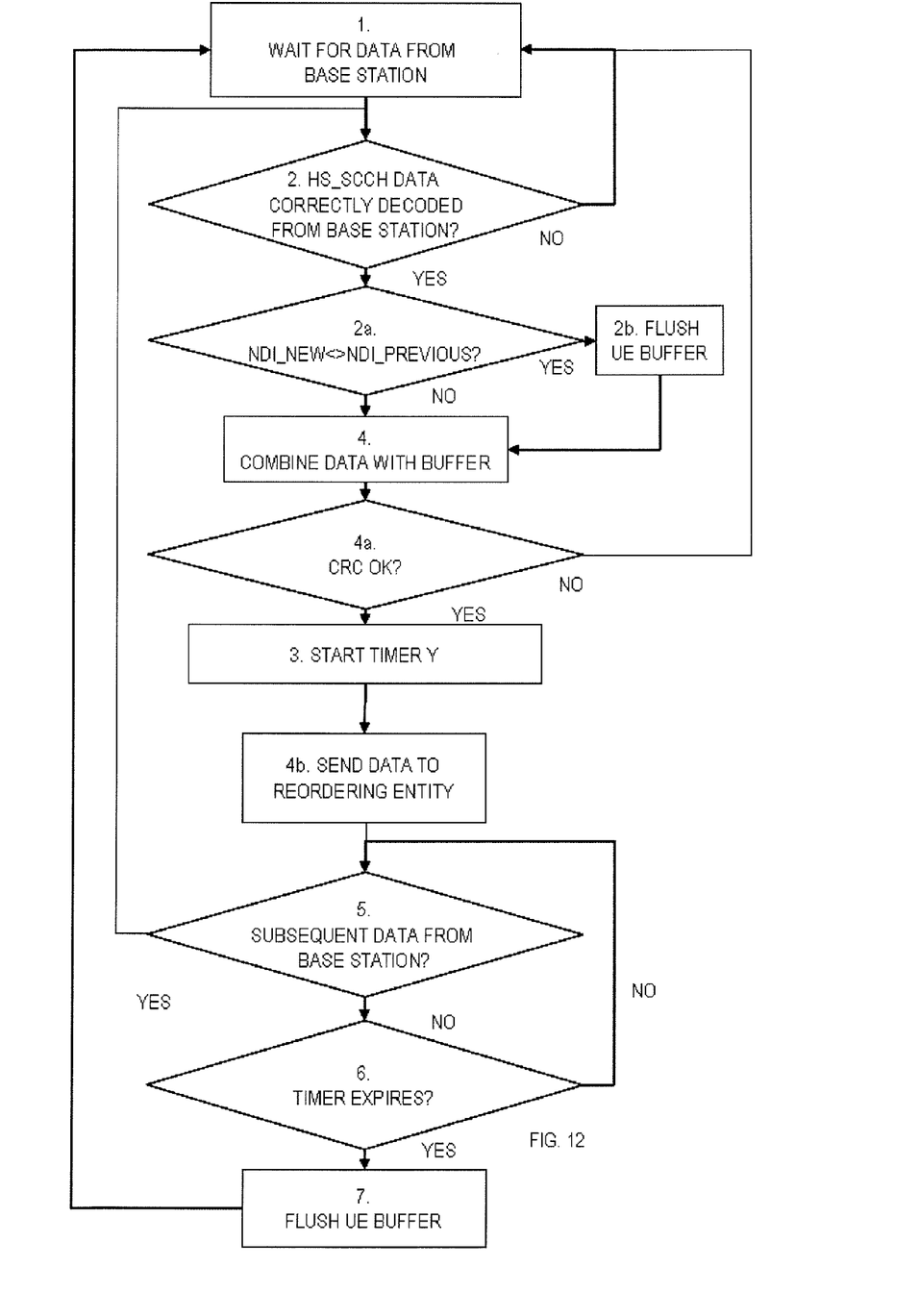
FIG. 12 shows a second embodiment of user entity functionality according to the invention.

As an alternative to the method above shown in FIG. 9, is shown in FIG. 12 where among other step 2 is modified such that it is investigated whether data from the base station (Node B) is correctly decoded over the HS-SSCH channel for a given HARQ process (2, 3). Moreover, step 5 is modified such that it is investigated whether subsequent data from the base station (Node B) is correctly decoded over the HS-SSCH for a given HARQ process (2, 3).

More specifically, in FIG. 12, in step 1 data is awaited from the base station. In step 2, it is investigated whether HS_SCCH data and HS-PDSCH from the base station is correctly decoded. If this data is correctly decoded from the base station, step 2, it is examined whether the NDI flag has changed from its previous value, step 2a. If that is the case the UE flushes its buffer, step 2b, and if not, step 3, the UE combines the received data with the contents of its buffer, step 4. A CRC check is made subsequently, 4a, if the CRC check is positive a timer Y is started, 3 and data is transferred to the reordering entity, step 4b. The process proceeds to step 5, in which subsequent data from the base station is awaited. If more data is received, it proceeds to step 2, if not it is investigated whether the timer Y has expired, step 6; if this is the case the buffer is flushed, 7, and moves to step 1; if it is not the case the process moves to step 5.

The effect of the above procedure, FIG. 9 and FIG. 12, is that the UE HARQ process will decode subsequent HS-SCCH/HS-PDSCH transmission independent on any earlier transmission, If we consider situations where the UE due to an obstacle looses contact with the 3GPP network for a considerably longer time than e.g. the T1 timer setting, it is very likely that the Node B HARQ processes have discarded its MAC-hs PDU content. To flush the HARQ processes during such a situation will minimize the risk of combining incorrect (or correct) data from one earlier MAC-hs PDU with TSN=y with incorrect (or correct) data from MAC_hs PDU with TSN<>y.

Concerning the probabilities for receiving an ACK, NACK or DTX signal, most transmission will result in a successful decoding in UE and successful reception of the feedback at the Node-B, which is obvious to obtain a good HSDPA throughput. At the cell border, or due to various kinds of obstacles, the radio signal quality may decrease such that Node-B fails to receive an ACK upon a MAC-hs transmission. Of course situations may occur when the uplink radio quality is poor whilst downlink radio quality is good, but Node-B will then (normally) start its retransmit procedure and try multiple times. If the uplink radio quality persists to be poor Node-B will detect this and prevent subsequent transmission.

Of course the previous situation may occur during a MAC-hs transmission but we think it more likely that both the downlink and the uplink will be poor simultaneously and this will be the main reason to end up in the problem scenario addressed in this invention.

At rare occasions, HS-SCCH transmission (-s) will perceive so poor radio quality that none of the repetitions will be successful. When these occasions occur our invention will increase the probability for a successful outcome for the subsequent transmission.

The invention claimed is:

1. Method for a base station engaging in transmissions via at least a media access layer with a user entity, comprising:
    wherein the base station is transmitting data to the user entity over a high speed scheduling channel and a high speed packet data scheduling channel;
    the base station having a plurality of hybrid automatic repeat request (HARQ) entities cooperating with a scheduler for transmitting frames from at least the base station to the user entity for a given HARQ process, each HARQ entity receiving either a not acknowledge signal or an acknowledge signal or detecting a discontinuous transmission for a given HARQ process, the base station transmitting a next data indicator to the user entity;
    the user entity having at least one buffer associated with a given HARQ process, the buffer storing and performing incremental combining of received data relating to data from the base station, the buffer more over capable of being flushed, the method comprising the steps of awaiting a scheduling instruction and scheduling of download data;
if the outcome from previous media access transmission or transmissions is detected as a discontinuous transmission setting the next data indicator to the value previously used,
otherwise toggling the next data indicator value;
transmitting data for the given HARQ process.

2. Base station engaging in transmissions via at least a media access layer with a user entity; wherein
the base station is transmitting data to the user entity over a high speed scheduling channel (HS-SCCH) and a high speed packet data scheduling channel (HS-DPCCH);
the base station having a plurality of hybrid automatic repeat request (HARQ) entities cooperating with a scheduler for transmitting frames from at least the base station to the user entity, each HARQ entity receiving either a not acknowledge signal (NACK) or an acknowledge signal (ACK) or detecting a discontinuous transmission (DTX) for a given HARQ process, the base station transmitting a next data indicator to the user entity;
the user entity having at least one buffer associated with a given HARQ process, the buffer storing and performing incremental combining of received data relating to data from the base station, the buffer moreover capable of being flushed, a respective HARQ entity
awaiting a scheduling instruction and scheduling of download data;
if the outcome from previous MAC transmission or transmissions is detected as a discontinuous transmission setting the next data indicator to the value previously used;
otherwise toggling the next data indicator value;
transmitting data for the given HARQ process.

3. Base station according to claim 2, comprising a scheduler in a base station, a plurality of input buffers, a plurality of HARQ entities, each entity comprising HARQ process means for controlling and performing the transmission of data for a given HARQ process, the base station furthermore comprising a layer 1 receiver, a CQI decoder and a user entity feedback decoder, the scheduler comprising a processing means for evaluating ACK, NACK and DTX conditions.

* * * * *

UNITED STATES PATENT AND TRADEMARK OFFICE
CERTIFICATE OF CORRECTION

PATENT NO. : 8,214,711 B2
APPLICATION NO. : 12/521707
DATED : July 3, 2012
INVENTOR(S) : Lindskog et al.

Page 1 of 1

It is certified that error appears in the above-identified patent and that said Letters Patent is hereby corrected as shown below:

In Fig. 6, Sheet 5 of 11, for Tag "39", in Line 2, delete "DISSAMBLY" and insert -- DISASSEMBLY --, therefor.

In Fig. 6, Sheet 5 of 11, for Tag "39", in Line 5, delete "DISSAMBLY" and insert -- DISASSEMBLY --, therefor.

In Fig. 9, Sheet 8 of 11, in Box "2a", delete "PREVIO" and insert -- PREVIOUS --, therefor.

In Column 3, Line 17, delete "means" and insert -- means, --, therefor.

In Column 3, Lines 27-28, delete "retrans-mission" and insert -- retransmission --, therefor.

In Column 7, Line 22, delete "HSPDA" and insert -- HSPDA, --, therefor.

In Column 8, Line 56, delete "higher higher" and insert -- higher --, therefor.

In Column 12, Line 66, in Claim 1, delete "more over" and insert -- moreover --, therefor.

Signed and Sealed this
Sixth Day of November, 2012

David J. Kappos
*Director of the United States Patent and Trademark Office*